(12) United States Patent
Zhang et al.

(10) Patent No.: US 9,549,188 B2
(45) Date of Patent: Jan. 17, 2017

(54) GOLDEN FRAME SELECTION IN VIDEO CODING

(71) Applicant: Intel Corporation, Santa Clara, CA (US)

(72) Inventors: Ximin Zhang, San Jose, CA (US); Sang-Hee Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 14/446,556

(22) Filed: Jul. 30, 2014

(65) Prior Publication Data
US 2016/0037170 A1 Feb. 4, 2016

(51) Int. Cl.
*H04N 19/142* (2014.01)
*H04N 19/124* (2014.01)
*H04N 19/172* (2014.01)
*H04N 19/147* (2014.01)
*H04N 19/115* (2014.01)
*H04N 19/105* (2014.01)
*H04N 19/503* (2014.01)
*H04N 19/139* (2014.01)
*H04N 19/14* (2014.01)

(52) U.S. Cl.
CPC .......... *H04N 19/142* (2014.11); *H04N 19/115* (2014.11); *H04N 19/124* (2014.11); *H04N 19/147* (2014.11); *H04N 19/172* (2014.11); *H04N 19/105* (2014.11); *H04N 19/139* (2014.11); *H04N 19/14* (2014.11); *H04N 19/503* (2014.11)

(58) Field of Classification Search
CPC .. H04N 7/50; H04N 7/26244; H04N 7/26271; H04N 7/26015; H04N 7/26031; H04N 19/142; H04N 19/115; H04N 19/147; H04N 19/124; H04N 19/172; H04N 19/139; H04N 19/14; H04N 19/105; H04N 19/503
See application file for complete search history.

(56) References Cited

U.S. PATENT DOCUMENTS

2007/0237237 A1* 10/2007 Chang .................. H04N 19/61
375/240.21
2007/0248163 A1* 10/2007 Zuo ..................... H04N 19/176
375/240.2

(Continued)

OTHER PUBLICATIONS

International Search Report and Written Opinion for International Patent Application No. PCT/US2015/030631, mailed on Aug. 20, 2015.

(Continued)

*Primary Examiner* — Sath V Perungavoor
*Assistant Examiner* — Howard D Brown, Jr.
(74) *Attorney, Agent, or Firm* — Green, Howard & Mughal LLP

(57) ABSTRACT

Techniques related to designating golden frames and to determining frame sizes and/or quantization parameters golden and non-golden frames for video coding are discussed. Such techniques may include designating an frame as a golden frame or a non-golden frame based on whether the frame is a scene change frame, a distance of the frame to a previous golden frame, and an average temporal distortion of the frame and determining a frame size and/or quantization parameter for the frame based on the designation and a temporal distortion of the frame.

25 Claims, 7 Drawing Sheets

(56) References Cited

U.S. PATENT DOCUMENTS

| | | | |
|---|---|---|---|
| 2007/0248164 A1* | 10/2007 | Zuo | H04N 19/176 375/240.2 |
| 2009/0135901 A1 | 5/2009 | Au et al. | |
| 2012/0224629 A1* | 9/2012 | Bhagavathy | H04N 19/172 375/240.08 |
| 2013/0279567 A1 | 10/2013 | Brailovskiy et al. | |
| 2014/0328384 A1* | 11/2014 | Novotny | H04N 21/23655 375/240.02 |
| 2015/0373328 A1* | 12/2015 | Yenneti | H04N 19/61 375/240.03 |

OTHER PUBLICATIONS

Bankoski, Jim et al., "Technical overview of VP8, an open source video codec for the web", 2011 IEEE International Conference on Multimedia and Expo (ICME), Jul. 11-15, 2011, pp. 1-6.

Manoranjan, Paul et al., "Video coding with dynamic background", EURASIP Journal on Advances in Signal Processing 2013, Jan. 31, 2013, pp. 1-17, ISSN 1687-6180.

Mukherjee, Debargha et al., "The latest open-source video codec VP9—an overview and preliminary results", Picture Coding Symposium (PCS), 2013, Dec. 8-11, 2013, pp. 390-393.

* cited by examiner

GOLDEN FRAME SELECTION IN VIDEO CODING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In some approaches, frame type selections may be made for video frames that are being compressed. For example, the frame types may include intra frames (I-frames) predicted without reference to another frame or frames, predicted frames (P-frames) predicted with reference to another frame or frames and available for use in prediction of other frames, and/or bi-directional frames (B-frames) predicted with reference to another frame or frames but not available for use in prediction of other frames. Other frame types may be available. Furthermore, in some approaches, a video frame may be designated as a golden frame. For example, for a current frame, one or more recent past frames and/or temporally close future frames may typically be made available for coding the current frame (e.g., using motion compensation techniques or the like). In addition, in some implementations, a golden frame such as a more distant past frame, for example, may be made available for coding the current frame. For example, in the VP8 and VP9 video compression formats, which may be particularly advantageous for video streaming, the use of a golden frame is a feature that may be enabled. In such contexts, the selection of which frames are golden frames and the rate control of such golden frames may be important decisions in the resultant video quality and compression. However, current techniques for selecting and providing rate control for golden frame may not provide for high quality video and/or high compression gains.

As such, existing techniques may not provide high visual quality video for users and/or effective compression. Such problems may become critical as the transmission of video at ever higher quality becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
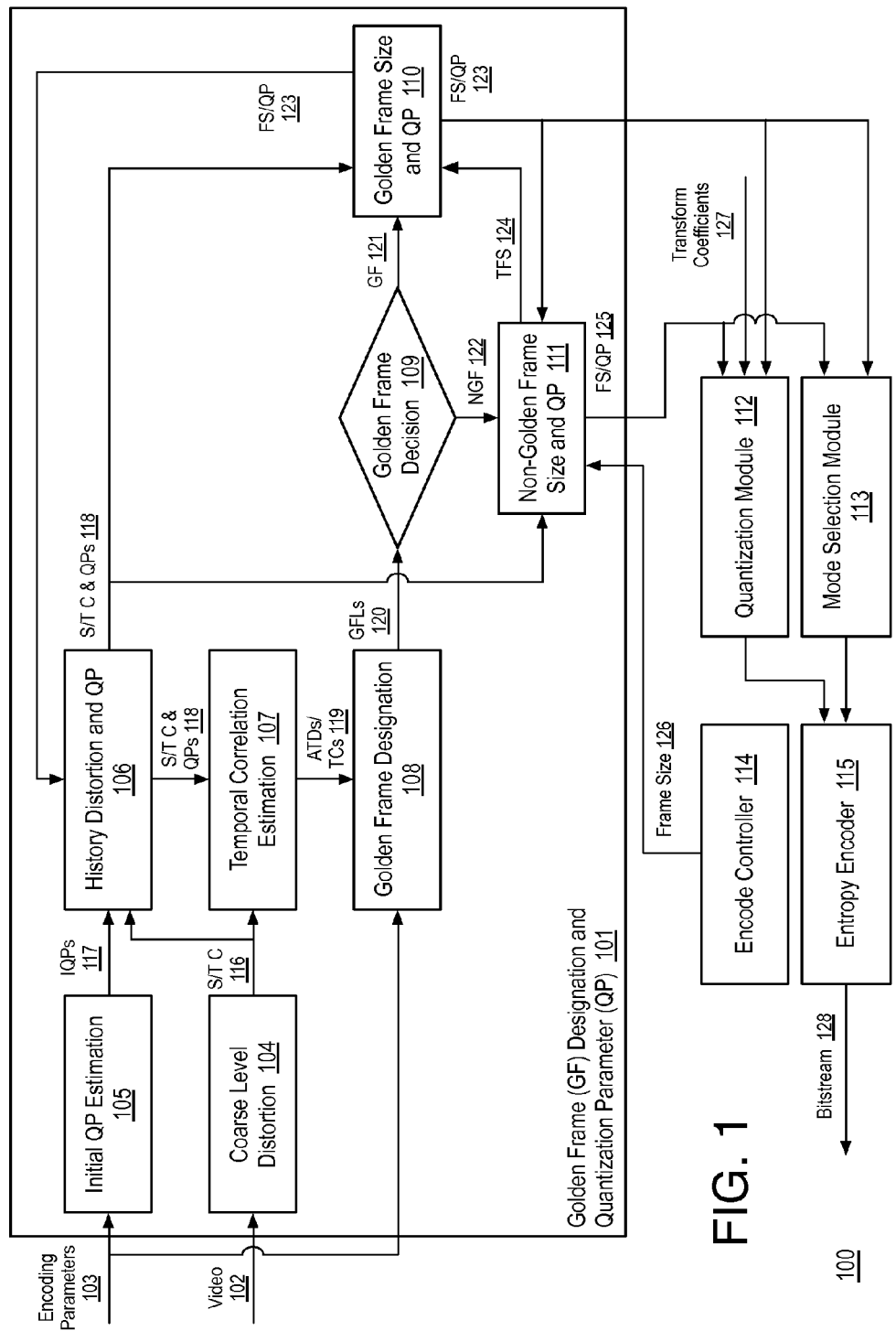
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to golden frame selection and frame size and/or quantization parameter determination for the golden frame and subsequent non-golden frames.

As described above, it may be advantageous to provide higher visual quality and greater compression in many video coding implementations. Also as discussed, in some video codec systems, a golden frame may be selected or designated. For example, a golden frame may be a more distant past frame made available for coding a current frame, a frame encoded with greater quality (e.g., more bits) to provide a better reference for coding a current frame, or the like. As used herein, the term golden frame is used to designate such a frame; however, any terminology may be used to denote such a frame such as super frame or the like. In some examples, a golden frame may be encoded at a higher quality as compared to non-golden frames of the same type and/or a golden frame may be retained (e.g., via memory) for coding a greater number of frames as compared to non-golden frames of the same type. For example, a golden frame may be retained until a next golden frame is designated and encoded while a non-golden frame may only be retained for coding a next frame or two following frames or the like.

In some embodiments, video coding may include designating an individual frame of a video sequence as a golden frame and/or determining a frame size or quantization parameter for the individual frame designated as a golden frame. As discussed further herein, for an individual frame of a video sequence, whether the individual frame is a scene change frame, a golden frame distance (e.g., a distance expressed in a number of frames to a previous golden frame), and an average temporal distortion may be determined. For example, the average temporal distortion may be the average of the temporal distortion of the individual frame and the temporal distortions preceding the individual frame since the previous golden frame). Based on whether the individual frame is a scene change frame, the golden frame distance, and the average temporal distortion, the individual frame may be designated as a golden frame or a non-golden frame. For example, if the individual frame is a scene change frame, the individual frame may be designated as a golden frame. If the individual frame is not a scene change frame, based on the golden frame distance, the average temporal distortion may be compared to a threshold to designate the individual frame as a golden frame or a non-golden frame.

If the individual frame is designated as a golden frame, a frame size (e.g., a target frame size for encoding the individual frame) and/or a quantization parameter may be determined based on the temporal distortion of the individual frame, the golden frame distance, and a predetermined average target bitrate for the video sequence as is discussed further herein. Furthermore, for a frame subsequent to the golden individual frame, a frame size and/or quantization parameter may be determined based on the encoded golden frame size, the golden frame distance, the predetermined average target bitrate, and the golden frame target size.

The golden frame and non-golden frame quantization parameters may be used to quantize transform coefficients associated with the frames and the quantized transform coefficients and quantization parameters may be encoded into a bitstream for use at a decoder. The decoder may decompress and/or decode the bitstream to generate reproduced frames for presentment to a user. Furthermore, the golden frame and non-golden frame quantization parameters may be used to generate mode selections associated with the video sequence for use in encoding.

FIG. 1 is an illustrative diagram of an example system 100 for providing video coding, arranged in accordance with at least some implementations of the present disclosure. As shown in FIG. 1, system 100 may include a golden frame (GF) designation and quantization parameter (QP) module 101, a quantization module 112, a mode selection module 113, an encode controller 114, and an entropy encoder module 115. Also as shown, golden frame designation and QP module 101 may include a coarse level distortion module 104, an initial quantization parameter (QP) estimation module 105, a historical distortion and quantization parameter (QP) module 106, a temporal correlation estimation module 107, a golden frame designation module 108, a golden frame decision module 109, a golden frame size and quantization parameter (QP) module 110, and non-golden frame size and quantization parameter (QP) module 111.

Also as shown, golden frame designation and QP module 101 may receive a video 102 and encoding parameters 103, and entropy encoder module 115 may provide or transmit a bitstream 128. System 100 may provide, for example, video compression and system 100 may be a video encoder implemented via a computer or computing device or the like. For example, system 100 may generate bitstream 128 that is compatible with a video compression-decompression (codec) standard such as the VP8 standard or the VP9 standard or the like.

System 100 may include other modules not shown for the sake of clarity of presentation. For example, system 100 may include a transform module, an intra prediction module, a motion estimation module, a motion compensation module, an in-loop filtering module, a reference frame buffer, a scanning module, or the like. In some examples, system 100 may include a local decode loop for generating reference frames used in the encoding process. Such modules are known to those of skill in the art and are not discussed further herein for the sake of clarity in presenting the described techniques.

As discussed, golden frame designation and QP module 101 may receive video 102 and encoding parameters 103. Video 102 may include any suitable video frames, sequence of video frames, video data, or the like in any suitable resolution. For example, video 102 may be video graphics array (VGA), high definition (HD), Full-HD (e.g., 1080p), or 4K resolution video, or the like. Furthermore, video 102 may include any number of video frames, sequences of video frames, or scenes or the like. Frame selections and/or mode selections (not shown) may be made for video 102 such that video frames of video 102 may each be designated with a frame type. The frame types may include any suitable frame type or types, which may be defined by a standard or a protocol or the like. For example, the frame types may include intra frames (I-frames) predicted without reference to another frame or frames, predicted frames (P-frames) predicted with reference to another frame or frames and available for use in prediction of other frames, bi-directional frames (B-frames) predicted with reference to another frame or frames but not available for use in prediction of other frames, and/or reference bi-directional frames (B-reference frames) predicted with reference to another frame or frames and available for use in prediction in hierarchical coding structures. In some examples B-frames may not be available and only I- and P-frames may be used. For example, in the VP8 standard only I- and P-frames are available. In other examples, such as the VP9 standard, H.264/MPEG-4 Advanced Video Coding (AVC) standard, and the High Efficiency Video Coding (HEVC) standard, all of I-, P- and B-frames may be available.

Encoding parameters 103 may include any parameters associated with the encoding of video 102. For example, encoding parameters 103 may include a target bitrate for video 102 such as a predetermined average target bitrate or the like. In some examples, encoding parameters 103 may include an indication of a video quality (e.g., a desired or required video quality or the like) such as a quality factor set by or determined by a user, a quality of a communications connection to system 100, a resolution of video 102, quantization parameter ranges (e.g., QP ranges associated with the codec being implemented via system 100), or the like. Furthermore, in some examples, encoding parameters 103 may include a minimum golden frame interval (e.g. a minimum duration or number of frames between golden frames), a default golden frame interval (e.g. a default duration or number of frames between golden frames), and a maximum golden frame interval (e.g. a maximum duration or number of frames between golden frames). As shown, encoding parameters 103 (or a portions thereof) may be provided to initial QP estimation module 105 and golden frame designation module 108.

As shown, initial QP estimation module 105 may receive encoding parameters 103 (or a portion thereof) and initial QP estimation module 105 may generate initial quantization parameters (IQPs) 117. Initial quantization parameters 117 may include initial quantization parameters for each frame type implemented via system 100. For example, an initial quantization parameter for I-frames (e.g., Initial_QP (I)), an initial quantization parameter for P-frames (e.g., Initial_QP (P)), and/or an initial quantization parameter for B-frames (e.g., Initial_QP (B)) may be determined. As discussed, in some examples, B-frames may not be implemented and, in such examples, no initial quantization parameter for B-frames may be determined. Such initial quantization parameters 117 may be generated based on a target bitrate for video 102, a target quality of video 102, and/or quantization parameter ranges (e.g., as provided via encoding parameters 103), for example. Initial quantization parameters 117 may include any suitable values. For example, initial quantization parameters 117 may range from 1 to 51 with values of about 20 to 26 providing medium quality video, values of about 27 to 31 providing low quality video, and values of about 15 to 19 providing high quality video, although any values and/or ranges may be used. As shown, initial quantization parameters 117 may be provided to historical distortion and QP module 106, which may store initial quantization parameters 117 and/or provide them to other modules as needed.

For a first I-frame of video 102 (or a sequence of video 102), a quantization parameter may be determined based on a modulation of the initial quantization parameter for I frames (e.g., Initial_QP (I)). For example, as shown, coarse level distortion module 104 may determine spatial and/or temporal complexity (S/T C) values 116 for frames of video 102. The spatial complexity may be determined using any suitable technique that provides a measure of the spatial complexity of a video frame of video 102. In an embodiment, the spatial complexity is estimated based on the intra prediction distortion of a video frame of video 102. Furthermore, the temporal complexity for a video frame of video 102 may be determined using any suitable technique that provides a measure of the temporal complexity of a video frame. In an embodiment, the temporal complexity is estimated based on the inter prediction distortion of a video frame of video 102. In various examples, the measure of intra prediction distortion, inter prediction distortion, or both may be based on a statistical measure such as a sum of absolute differences (SAD), a summation of distortion, or the like. In some examples, the intra prediction distortion, the inter prediction distortion, or both may be determined based on a down-sampled version of a video frame of video 102. For example, a frame of video 102 may be down-sampled or down-scaled by a factor of 2, 4, or 8, or the like prior to the determination of the intra prediction distortion, the inter prediction distortion, or both for the video frame. For some video frames of video 102 both spatial and temporal complexity may be determined while for other video frames of video 102 only one of spatial or temporal complexity may be determined.

The quantization parameter for the first I-frame of video 102 may be determined based on the initial quantization parameter for I frames and the measure of spatial complexity for the first I-frame. In an embodiment, the quantization parameter for the first I-frame may be proportional to the measure of spatial complexity. For example, the quantization parameter for the first I-frame may be greater than initial quantization parameter for I-frames (e.g., Initial_QP (I)) when the spatial complexity of the first I-frame indicates high spatial complexity such that a relatively large quantization parameter may be used for frames with high spatial complexity (e.g., when a user may not notice a decrease in quality and compression may be increased) and relatively small quantization parameters may be used for frames with low spatial complexity (e.g., when higher quality may be beneficial to a user). In some examples, high spatial complexity may determined based on an intra prediction distortion and empirically determine constants.

As discussed, in an embodiment, the quantization parameter for the first I-frame may be proportional to the spatial complexity of the I-frame. For example, the quantization parameter for the first I-frame may be determined as shown in Equation (1):

$$QP_{INTRA} = \text{Initial\_QP}(I) \times \text{Distortion}(\text{Intra})^C / \text{Threshold1} \qquad (1)$$

where $QP_{INTRA}$ may be the quantization parameter for the first I-frame, Initial_QP (I) may be an initial QP value for an I-frame (as discussed above), Distortion(Intra) may be an intra spatial prediction distortion, C may be an empirically determined constant, and Threshold1 may be an empirically determined constant or threshold value.

As shown in Equation (1), the quantization parameter for the first I-frame may be proportional to the spatial complexity of the I-frame raised to a value, C. C may be any suitable value or constant such as, for example, 1, or any non-integer value. As discussed, C may be empirically determined and may be based on the method used to determine the spatial complexity (e.g., SAD or summation distortion or the like). In some examples, C may be based on the content of video 102 such that C may be adaptive or variable based on video 102. The determination of the quantization parameter for the first I-frame may be performed by golden frame size and QP module 110 (e.g., as the first I-frame is typically designated as a golden frame) or another module (not shown) of system 100.

As discussed, for frames of video 102, a designation may be made as to whether the frame is a golden frame. The designation of golden frames may be made for any frame type. Herein, the designation of frames as golden frames or non-golden frames is typically described with respect to P-frames; however, any frame type may be designated as a golden frame. Furthermore, as described, coarse level distortion module 104 may determine and provide spatial and/or temporal complexity values 116, which may include a measure of the spatial complexity and/or a measure of temporal complexity of a frame of video 102. As used herein, such complexity may be described as distortion. As shown, spatial and temporal complexity values 116 may be provided to historical distortion and QP module 106 and/or temporal correlation estimation module 107. Historical distortion and QP module 106 may also receive frame sizes and/or quantization parameters (FS & QP) 123 as is discussed further herein. Historical distortion and QP module 106 may store and provide spatial complexities, temporal complexities, spatial distortions, temporal distortions, frame sizes, quantization parameters, or temporal correlations or the like for frames of video 102. For example, historical distortion and QP module 106 may be implemented via a memory accessible to other modules of system 100 such as modules of golden frame designation and QP module 101.

As shown, historical distortion and QP module 106 may provide spatial and temporal complexities and quantization parameters (S/T C & QPs) 118 to temporal correlation estimation module 107. Spatial and temporal complexities and quantization parameters 118 may include spatial complexities, temporal complexities, spatial distortions, temporal distortions, or quantization parameters for frames of video 102 such as spatial complexities, temporal complexities, spatial distortions, temporal distortions, or quantization parameters for frames preceding a current frame or spatial complexities, temporal complexities, spatial distortions, temporal distortions, or quantization parameters for frames preceding a current frame up to a previous golden frame or the like.

Temporal correlation estimation module 107 may determine average temporal distortions and temporal correlations for one or more frames of video 102 and temporal correlation estimation module 107 may provide average temporal distortions and/or temporal correlations (ATD/TCs) 119 to golden frame designation module 108. For example, temporal correlation estimation module 107 may determine a temporal correlation for an individual frame (e.g., a P-frame) of video 102. The temporal correlation may be determined using any suitable technique or techniques. For example, the temporal correlation for an individual frame may be estimated based on a temporal complexity of the individual frame and its comparison with history average temporal complexities of past frames (e.g., past encoded P-frames). In an embodiment, the temporal correlation for an individual frame is the ratio of the temporal complexity of the individual frame to a history average of temporal complexities. The history average may be based on any number of past frames such as all past frames up to a previous golden frame, all past frames available via historical distortion and QP module 106, a predetermined number of past frames, or the like. Furthermore, temporal correlation estimation module 107 may determine an average temporal distortion for an individual frame (e.g., a P-frame) of video 102. For example, the average temporal distortion for an individual frame may be the average of the temporal distortion of the individual frame and temporal distortions of past frames (e.g., frames preceding the individual frame). The past frames may include any number of past frames such as all past frames up to a previous golden frame, all past frames available via historical distortion and QP module 106, a predetermined number of past frames, or the like.

Golden frame designation module 108 may receive average temporal distortions and/or temporal correlations 119 and golden frame designation module 108 may designate golden frames based in part on temporal correlations received via average temporal distortions and/or temporal correlations 119. For example, for frames of video 102, golden frame designation module 108 may designate a golden frame or frames based on which (if any) frames are scene change frames and based on the temporal correlation of video 102 (or a portion or segment of video 102). In an embodiment, if an individual frame of video 102 is a scene change frame, the individual frame is designated as a golden frame. A frame may be determined to be a scene change based on any suitable technique or techniques. In an embodiment, the temporal correlation of an individual frame may be compared to a predetermined threshold such that if the temporal correlation is greater than the threshold, the individual frame is deemed to be a scene change frame. If the individual frame is not a scene change frame, golden frames may be designated within or allocated to portions of video 102 based on the temporal correlation of the portion of video 102. For example, portions of video 102 having strong temporal correlation may have larger golden frame intervals (e.g., numbers of frames between golden frames) and portions of video 102 having weak temporal correlation may have shorter golden frame intervals.

Figure 2:
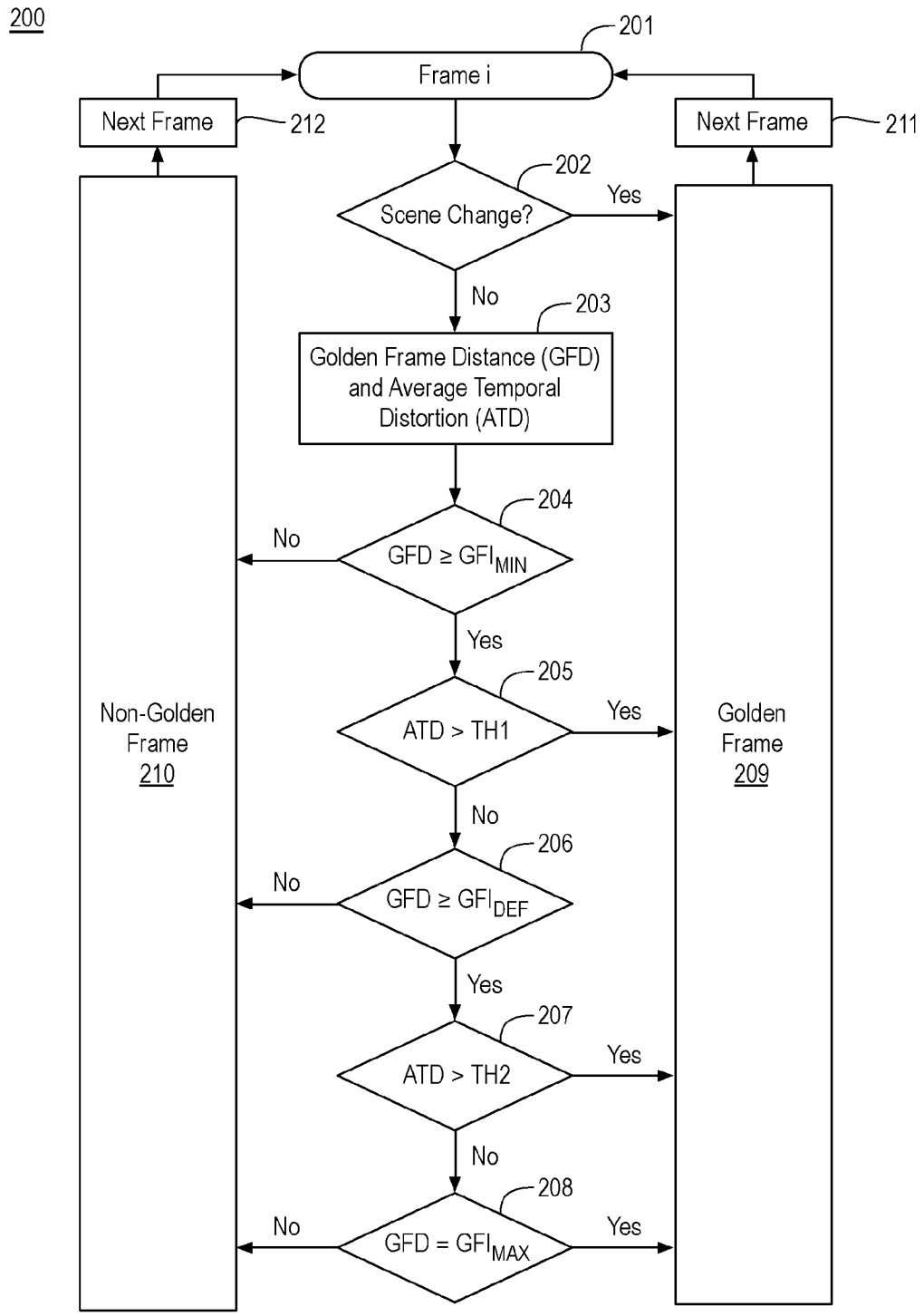
FIG. 2 is a flow diagram illustrating an example process for designating golden frames in video coding.

FIG. 2 is a flow diagram illustrating an example process 200 for designating golden frames in video coding, arranged in accordance with at least some implementations of the present disclosure. Process 200 may include one or more operations 201-212 as illustrated in FIG. 2. Process 200 may form at least part of a video coding process. By way of non-limiting example, process 200 may form at least part of a video coding process for video as undertaken by system 100 as discussed herein. In some examples, process 200 may be performed by golden frame designation module 108.

Process 200 may begin at operation 201, "Frame i", where an individual frame of a video sequence may be determined. For example, process 200 may begin at a first frame of video 102, a first frame after a golden frame, a first frame after an I-frame, or the like. In some examples, frame i may be a predetermined number of frames after a golden frame such as 2 to 5 frames or the like.

Process 200 may continue at decision operation 202, "Scene Change", where it may be determined whether frame i is a scene change frame. For example, for an individual frame of a video sequence, it may be determined whether the individual frame is a scene change frame. The scene change frame determination may be made using any suitable technique such as comparing a temporal correlation of the individual frame to a threshold. For example, if the temporal correlation of the individual frame is greater than or greater than or equal to the threshold, the individual frame may be a scene change frame. As shown, if the individual frame (e.g., frame i) is determined to be a scene change frame, process 200 may continue at operation 209, "Golden Frame", where the individual frame may be designated as a golden frame.

From operation 209, process 200 may continue at operation 211, "Next Frame", where a next frame may be selected for processing. For example, a frame subsequent to frame i or a frame a certain number of frames after frame i may be selected for processing as discussed. Furthermore, if a last frame has been processed, process 200 may end.

Returning to decision operation 202, if the individual frame (e.g., frame i) is not determined to be a scene change frame, process 200 may continue at operation 203, "Golden Frame Distance (GFD) and Average Temporal Distortion (ATD)", where a golden frame distance and an average temporal distortion may be determined for the individual frame (e.g., frame i). In an embodiment, the golden frame distance is the distance (e.g., a number of frames) from the individual frame (e.g., frame i) to a previous golden frame. For example, if frame i is a P-frame, the previous golden frame may be a golden P-frame or a golden I-frame. If there has been no previous golden frame, the golden frame distance may be the distance to a previous I-frame. The average temporal distortion for the individual frame (e.g., frame i) may be determined as discussed above such that the average temporal distortion for the individual frame (e.g., frame i) may be the average of the temporal distortion of the individual frame and temporal distortions of past frames (e.g., frames preceding the individual frame). For example, the average temporal distortion may be a running average of temporal distortion. In some examples, the temporal distortion may be an inter prediction distortion on down-sampled video and, in other examples, the temporal distortion may be real distortion after compression of the frame. As discussed, the past frames may include any number of past frames such as all past frames up to a previous golden frame, all past frames available via historical distortion and QP module 106, a predetermined number of past frames, or the like.

Furthermore, as discussed herein with respect to encoding parameters 103, a minimum golden frame interval (e g a minimum duration or number of frames between golden frames), a default golden frame interval (e.g. a default duration or number of frames between golden frames), and a maximum golden frame interval (e.g. a maximum duration or number of frames between golden frames) may be determined or received. The minimum, default, and maximum golden frame intervals may include any suitable durations or number of frames. For example, the minimum golden frame interval may be 0.25 seconds, the default golden frame interval may be 0.5 seconds, and the maximum golden frame interval may be 1 second. For video of 60 frames per second (fps), the minimum, default, and maximum golden frame intervals in such an example would be 15 frames, 30 frames, and 60 frames, respectively. In other examples, the minimum golden frame interval may be in the range of 10 to 20 frames, the default golden frame interval may be in the range of 20 to 40 frames, and the maximum golden frame interval may be in the range of 40 to 80 frames.

Process 200 may continue at decision operation 204, "GFD≥$GFI_{MIN}$", where the golden frame distance (GFD) may be compared to the minimum golden frame interval ($GFI_{MIN}$). As shown, if the golden frame distance is less than the minimum golden frame interval, process 200 may continue at operation 210, "Non-Golden Frame", where the individual frame may be designated as a non-golden frame.

From operation 210, process 200 may continue at operation 212, "Next Frame", where a next frame may be selected for processing. For example, a frame subsequent to frame i or a frame a certain number of frames after frame i may be selected for processing. Furthermore, if a last frame has been processed, process 200 may end.

Returning to decision operation 204, if the golden frame distance is greater than or equal to the minimum golden frame interval, process 200 may continue at decision operation 205, "ATD>TH1", where the average temporal distortion (ATD) may be compared to a threshold (TH1). Threshold TH1 may be any suitable threshold for evaluating the temporal complexity, distortion, and/or correlation of video 102. Threshold TH1 may be chosen such that video sequences having greater temporal correlation (e.g., static video sequences) have larger golden frame distances and video sequences having less temporal correlation (e.g., active video sequences) have shorter golden frame distances. As shown, if the average temporal distortion is greater than the threshold, process 200 may continue at operation 209, where the individual frame (e.g., frame i) may be designated as a golden frame and processing may continue at operation 211 as discussed above.

If the average temporal distortion is not greater than the threshold, process 200 may continue at decision operation 206, "GFD≥$GFI_{DEF}$", where the golden frame distance (GFD) may be compared to the default golden frame interval ($GFI_{DEF}$). As shown, if the golden frame distance is less than the default golden frame interval, process 200 may continue at operation 210, where the individual frame may be designated as a non-golden frame, and operation 212 as discussed above.

If the golden frame distance is greater than or equal to the default golden frame interval, process 200 may continue at decision operation 207, "ATD>TH2", where the average temporal distortion (ATD) may be compared to a threshold (TH2). Threshold TH2 may be any suitable threshold for evaluating the temporal complexity, distortion, and/or correlation of video 102. As with TH1, threshold TH2 may be chosen such that video sequences having greater temporal correlation (e.g., static video sequences) have larger golden frame distances and video sequences having less temporal correlation (e.g., active video sequences) have shorter golden frame distances. In an embodiment TH1 is greater than TH2 such that if the video is very active, another golden frame will be provided quickly while if the video is active but less so, the golden frame may be extended to the maximum golden frame interval. As shown, if the average temporal distortion is greater than the threshold, process 200 may continue at operation 209, where the individual frame (e.g., frame i) may be designated as a golden frame and processing may continue at operation 211 as discussed above.

If the average temporal distortion is not greater than the threshold TH2, process 200 may continue at decision operation 208, "GFD=$GFI_{MAX}$", where the golden frame distance (GFD) may be compared to the maximum golden frame interval ($GFI_{MAX}$). As shown, if the golden frame distance is equal to the maximum golden frame interval, process 200 may continue at operation 209, where the individual frame may be designated as a golden frame, and operation 211 as discussed above. If the golden frame distance is not equal to the maximum golden frame interval (e.g., the golden frame distance is less than the maximum golden frame interval), process 200 may continue at operation 210, where the individual frame may be designated as a non-golden frame, and operation 212 as discussed above.

Process 200 may be performed any number of times in serial or in parallel for any number of frames of video 102 and for any number of videos or video sequences. In the above description, greater than, less than, and equal to and the like have been used for purposes of explanation, however, other comparisons may be made to effectuate the same or similar results. For example, when discussing a greater than or equal to comparison, oftentimes a greater than comparison may be used or the like.

As discussed, process 200 may implement two thresholds (e.g., TH1 and TH2) associated with a minimum golden frame interval and a default golden frame interval. In other examples, only one threshold may be used (e.g., for a minimum or default golden frame interval or the like). In other examples, additional threshold(s) and golden frame intervals may be used. As discussed, an individual frame i may be designated as a golden frame or a non-golden frame based on determining the golden frame distance of the individual frame is at least one of equal to or greater than a minimum golden frame interval and/or a default golden frame interval and designating the individual frame as a golden frame or as a non-golden frame based on a comparison of the average temporal distortion to a threshold associated with the minimum golden frame interval and/or a default golden frame interval.

In some examples, a second frame may be designated as a golden frame or a non-golden frame based on determining, for the second frame of the sequence of frames a second golden frame distance to the previous golden frame and a second average temporal distortion and designating the second frame as a golden frame or as a non-golden frame based on the second golden frame distance and the second average temporal distortion. For example, the golden frame distance (e.g., for the individual frame) may be between the minimum golden frame interval and the default golden frame interval and the second golden frame distance may be between the default golden frame interval and the maximum golden frame interval. For example, designating the individual frame as a golden frame or as a non-golden frame may be based on a comparison of the average temporal distortion of the individual frame to a first threshold and designating the second frame as a golden frame or as a non-golden frame may be based on a comparison of the second average temporal distortion to a second threshold. As discussed, in some examples, the first threshold (e.g. TH1) may be greater than the second threshold (e.g., TH2).

Returning to FIG. 1, golden frame designation module 108 may generate golden frame locations (GFLs) 120 based on the golden frame or non-golden frame designations as discussed. For example, golden frame locations 120 may indicate which frames are golden frames. Golden frame locations 120 may be transferred to golden frame decision module 109. Golden frame decision module 109 may, based on golden frame locations 120, provide an indication a frame (e.g., an individual frame such as a P-frame) is a golden frame (GF) 121 or a non-golden frame (NGF) 122.

Golden frame size and QP module 110 may receive golden frame indication 121 via golden frame decision module 109 and spatial and temporal complexities and quantization parameters 118 via history distortion and QP module 106. Golden frame size and QP module 110 may generate a frame size and/or quantization parameter (FS/QP) 123 for the indicated golden frame. For example, a golden frame target size may be determined for a golden frame based on the temporal distortion of the frame, the golden frame distance of the frame, and the target bitrate (e.g., as provided via encoding parameters 103 as discussed herein). As discussed, in some examples, the temporal distortion of the frame may be based on an inter prediction distortion using down-sampled video. In some examples, the golden frame target size may be determined as shown in Equation (2):

$$\text{Target\_Size}G = (\text{Golden\_Interval} - \text{Dist}(\text{Inter})/\text{Threshold2}) \times \text{Average\_Rate} \times W1 \quad (2)$$

where Target_SizeG may be the golden frame target size, Golden_Interval may be the golden frame distance for the frame (e.g., the distance to a previous golden frame), Dist (Inter) may be the temporal distortion (e.g., inter prediction distortion in this example), Threshold2 may be a threshold, Average_Rate may be the target bitrate (e.g., a predetermined average target bitrate for video 102), and W1 may be a weighting parameter. Threshold2 may be any suitable threshold and may be based on the technique used to generate the temporal distortion (eg., Dist(Inter)). For example, Threshold2 may scale the temporal distortion to modify the golden frame distance. For example, if the temporal distortion is low, a relatively large golden frame target size may result such that static video may be provided higher quality (e.g., when the user may notice video quality) and if temporal distortion is relatively high, a relatively small golden frame target size may result such that active video may be provided lower quality (e.g., since such lower quality may not be noticed by users in an active video setting). Furthermore, the weighing parameter may be any suitable weighing parameter for scaling the product of the difference between the golden frame distance and the scaled temporal distortion and the target bitrate. In an embodiment, the weighting parameter is 0.5.

Also as shown in FIG. 1, non-golden frame size and QP module 111 may receive non-golden frame indication 122 via golden frame decision module 109, spatial and temporal complexities and quantization parameters 118 via history distortion and QP module 106, and the discussed golden frame size (e.g., as part of frame size and/or quantization parameter (FS/QP) 123) via golden frame size and QP module 110. Non-golden frame size and QP module 111 may generate a frame size and/or quantization parameter (FS/QP) 125 for the indicated non-golden frame. In some examples, non-golden frame size and QP module 111 may generate a frame size and/or quantization parameter (FS/QP) 125 for a non-golden frame subsequent to a golden frame. For non-golden frames subsequent to such a first non-golden frame, standard rate control techniques may be applied such that, for example, subsequent non-golden frames may be determined to have the same target frame size and/or the same QP (as modified based on standard rate control techniques).

For example, a non-golden frame target size may be determined for a non-golden frame based on the golden frame distance of associated golden frame, the target bitrate (e.g., as provided via encoding parameters 103), and the target size of the associated golden frame. In some examples, the golden frame target size may be determined as shown in Equation (3):

$$\text{Target\_Size}P = (\text{Golden\_Interval} \times \text{Average\_Rate} - \text{Target\_Size}G)/(\text{GoldenInterval} - 1) \quad (3)$$

where Target_SizeP may be the non-golden frame target size, Golden_Interval may be the golden frame distance for the associated golden frame, Average_Rate may be the target bitrate (e.g., a predetermined average target bitrate for video 102), and Target_SizeG may be the golden frame target size for the associated golden frame.

As shown, non-golden frame size and QP module 111 may transfer the target size of the non-golden frame, target frame size (TFS) 124 to golden frame size and QP module 110. Golden frame size and QP module 110 may determine an offset for the initial quantization parameter (e.g., as discussed with respect to initial quantization parameters 117). The offset may be based on a ratio of the golden frame target size to the non-golden frame target size. For example, the offset may be a product of the binary log of the ratio of the golden frame target size to the non-golden frame target size and a constant. In some examples, the ratio (e.g. a golden ratio) may be determined as shown in Equation (4):

$$\text{Ratio\_}G = \text{Target\_Size}G / \text{Target\_Size}P \quad (4)$$

where Ratio_G may be the golden ratio, Target_SizeG may be the golden frame target size as discussed with respect to Equation (2), and Target_SizeP may be the non-golden frame target size as discussed with respect to Equation (3).

Furthermore, the offset (e.g., a golden offset) may be determined as shown in Equation (5):

$$\text{Offset\_}G = Q1 \times \text{Ln}_2(\text{Ratio\_}G) \quad (5)$$

where Offset_G may be the golden offset, Q1 may be a constant, $\text{Ln}_2$ may be a binary log, and Ratio_G may be the golden ratio as discussed with respect to Equation (4). Constant Q1 may be any suitable constant that scales the binary log of the golden ratio to provide an adjustment to the initial quantization parameter for, for example, a P-frame (e.g., Initial_QP (P)). As discussed, the initial quantization parameter may be determined via initial QP estimation module 105, which may be implemented by a bit rate controller or the like.

For example, the quantization parameter for the golden frame may be determined based on the initial quantization parameter and the golden offset. In some examples, the quantization parameter for the golden frame may be determined by subtracting the golden offset from the initial quantization parameter. In some examples, the quantization parameter for the golden frame may be determined as shown in Equation (6):

$$\text{QP}_{Golden} = \text{Initial\_QP}(P) - \text{Offset\_}G \quad (6)$$

where $\text{QP}_{Golden}$ may be the quantization parameter for the golden frame, Initial_QP (P) may be initial quantization parameter for P-frames, and Offset_G may be the golden offset as discussed with respect to Equation (5). As discussed, in this example, the golden frame is a P-frame. However, the initial quantization parameter for any frame type may modified by a golden offset to determine a golden frame quantization parameter.

As shown, the quantization parameter for the golden frame (e.g., via frame size and/or quantization parameters 123) may be provided to quantization module 112 and/or mode selection module 113. Quantization module 112 may receive the golden frame quantization parameter(s) and transform coefficients 127 and may quantize transform coefficients 127 based on the golden frame quantization parameter(s). For example, transform coefficients for the golden frame may be quantized based on the golden frame quantization parameter for that frame. Transform coefficients 127 may be any suitable transform coefficients such as, for example, transform coefficients based on a discrete cosine transform of luma data, chroma data, differential data (e.g., for differences between predicted blocks and actual blocks), or the like. Mode selection module 113 may receive frame size and/or quantization parameters 123, which may be used for mode selections and/or mode decisions.

As shown, quantization parameters (e.g., golden frame QPs and non-golden frame QPs as discussed further below), quantized transform coefficients and/or mode selection data may be transmitted to entropy encoder 115. Entropy encoder 115 may entropy encode the quantization parameters, quantized transform coefficients, mode selection data, and/or other data (e.g., motion vectors and the like) into bitstream 128. In some examples, the quantized transform coefficients, mode(s) data, and/or other data may be provided to a scanning module prior to encoding. Furthermore, although discussed herein with respect to entropy encoding, any suitable encoding technique(s) may be used. Bitstream 128 may be transmitted to another device for decoding or saved to a memory device or the like. In some examples, bitstream 128 may be a standards compliant bitstream such as, for example, a bitstream compliant with VP8 or VP9 or the like.

Furthermore, entropy encoder 115 may operate under the control of and/or be monitored by encoded controller 114. For example, encode controller 114 may determine encoded frame sizes via entropy encoder 115 and/or other modules of system 100. In some examples, encode controller 114 may determine an actual number of bits used to encode the discussed golden frame and transfer the actual golden frame size (frame size) 126 to non-golden frame size and QP module 111.

Non-golden frame size and QP module 111 may determine a quantization parameter for non-golden frame(s) based on the actual golden frame size, the golden interval of the golden frame, the average bitrate, and the golden frame target size. For example, the actual golden frame size may be used instead of the estimated golden frame size (as discussed with respect to Equation (2)) since any unused bits may thereby be used to encode the non-golden frames and increase the quality of the non-golden frames. In some examples, non-golden frame size and QP module 111 may determine the quantization parameter by modifying the initial quantization parameter for P-frames (Initial_QP (P) based on an offset. For example, the offset may be a product of the binary log of a ratio for non-golden frames and a constant. In some examples, the ratio (e.g., a non-golden ratio) may be determined as shown in Equation (7):

$$\text{Ratio\_}P = (\text{Golden\_Interval} \times \text{Average\_Rate} - \text{Actual\_Golden\_Size}) / (\text{Golden\_Interval} \times \text{Average\_Rate} - \text{Target\_Size}G) \quad (7)$$

where Ratio_P may be the non-golden ratio, Golden_Interval may be the golden frame distance for the associated golden frame, Average_Rate may be the target bitrate (e.g., a predetermined average target bitrate for video 102), Actual_Golden_Size may be the actual golden frame size, and Target_SizeG) may be the golden frame target size for the associated golden frame.

Furthermore, the offset (e.g., a non-golden offset) may be determined as shown in Equation (8):

$$\text{Offset\_}P = Q1 \times \text{Ln}_2(\text{Ratio\_}P) \quad (8)$$

where Offset_P may be the non-golden offset, Q1 may be a constant, $\text{Ln}_2$ may be a binary log, and Ratio_P may be the non-golden ratio as discussed with respect to Equation (7). Constant Q1 may be any suitable constant that scales the binary log of the non-golden ratio to provide an adjustment to the initial quantization parameter for, for example, a P-frame (e.g., Initial_QP (P)). In some examples, the constant Q1 of Equation (5) and the constant Q1 of Equation (8) may be the same and, in other examples, they may be different. The example provided may evenly allocate remaining bits between non-golden frames. In other examples, a bit rate controller may modify the bit allocation based on a spatial or a temporal distortion of a non-golden frame or the like.

Offset_P may be applied to the initial quantization parameter (e.g., Initial_QP (P)) via adding it to the initial quantization parameter for example. As shown, non-golden frame size and QP module 111 may transfer the non-golden frame quantization parameter to quantization module 112 and/or mode selection module 113. For example, non-golden frame size and QP module 111 may transfer frame size and/or quantization parameters 125. Quantization module 112 may receive the non-golden frame quantization parameter(s) and transform coefficients 127 and may quantize transform coefficients 127 based on the non-golden frame quantization parameter(s). For example, transform coefficients for the non-golden frame may be quantized based on the non-golden frame quantization parameter for that frame. Furthermore, mode selection module 113 may receive frame size and/or quantization parameters 123, which may be used for mode selections and/or mode decisions.

Figure 3:
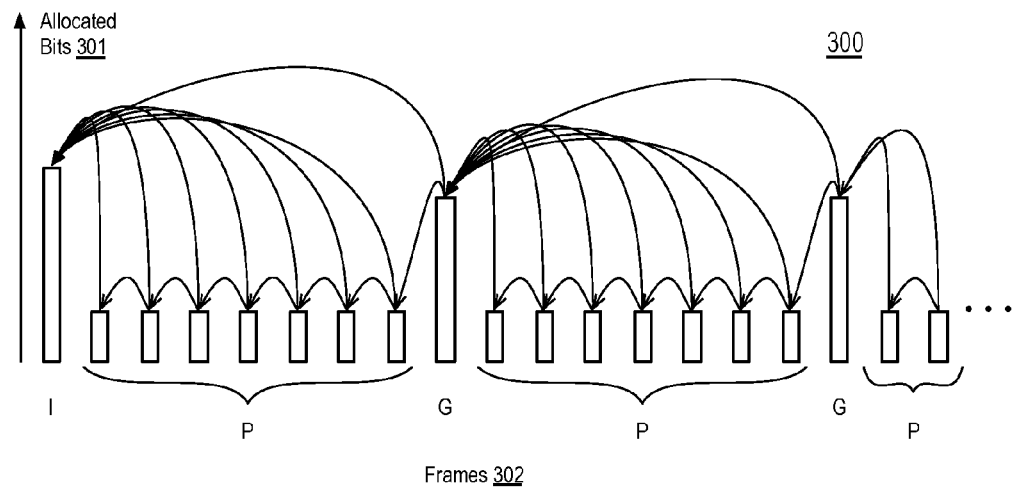
FIG. 3 illustrates an example golden frame distribution.

FIG. 3 illustrates an example golden frame distribution 300, arranged in accordance with at least some implementations of the present disclosure. As shown in FIG. 3, frames 302 may each have a number of allocated bits 301. As shown, golden frames (labeled "G") may have a greater bit allocation than non-golden frames (labeled "P") but less than that of I-frames (labeled "I"). For example, greater bit allocation may be associated with a smaller QP and a lesser bit allocation may be associated with a larger QP. As discussed, in some examples, I-frames may also be designated as golden or non-golden. Furthermore, as discussed, although frames 302 do not include any B-frames in the illustrated example, B-frames may be utilized in some examples. For example, the implementing the VP8 video codec may not include B-frames and systems implementing the VP9 video codec may include B-frames as discussed. As shown via the unlabeled arrows extending between frames 302, non-golden frames may reference to an immediately previous non-golden frame, a preceding I-frame, and/or a preceding golden frame for the purposes of prediction (e.g., motion estimation and compensation). Furthermore, golden frames may similarly reference to an immediately previous non-golden frame, a preceding I-frame, and/or a preceding golden frame. FIG. 3 illustrates that golden frames may be used as a reference for any intervening non-golden frames such that golden frames are retained for the purposes of coding more frames (and potentially many more frames) than non-golden frames. Therefore, the discussed increase in allocated bits 301 may provide for increased quality blocks or macroblocks or the like for prediction and/or motion compensation of subsequent frames. Although discussed with respect to immediately previous frames, in some embodiments, non-golden frames may be retained for coding more frames (e.g., two, three or four) but not for the same number of frames or in the same manner as for the discussed golden frames.

In the illustrated example, seven non-golden frames are between the I-frame and the first golden frame and between the first golden frame and the second golden frame. In other examples, any number of non-golden frames may be between I-frames and golden frames or between golden frames as discussed herein. For example, any number of frames from 1 frame to the maximum golden frame interval may be between I-frames and golden frames or between golden frames. Furthermore, in some examples, golden frames may be evenly distributed among frames 302 as illustrated while in other examples, golden frames may not be evenly distributed. In the discussion herein and in the illustrative example of FIG. 3, a single class of golden frames has been described. In other examples, two or more classes of golden frames may be implemented.

Figure 4:
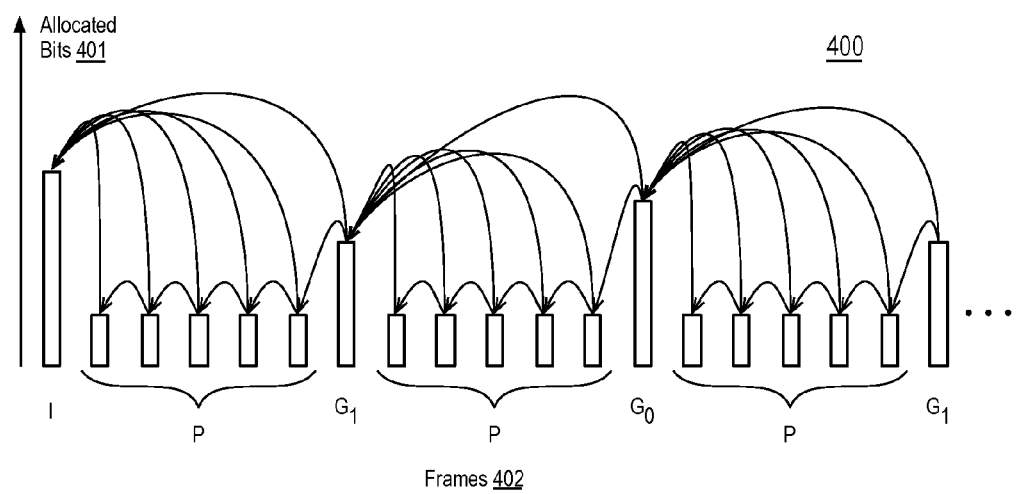
FIG. 4 illustrates an example golden frame distribution with two golden frame classes.

FIG. 4 illustrates an example golden frame distribution 400 with two golden frame classes, arranged in accordance with at least some implementations of the present disclosure. As shown in FIG. 4, frames 402 may each have a number of allocated bits 401. Also as shown, golden frames (labeled "G") may be divided into two classes (labeled "$G_0$" and "$G_1$") such that a golden frame may be designated as in or a member of a first golden frame class or a second golden frame class. For example, golden frame class $G_0$ may be allocated more bits as compared to golden frame class $G_1$ such that golden frame class $G_0$ may have a lower QP as compared to golden frame class $G_1$. In the illustrated example, two golden frame classes are illustrated; however, any number of golden frame classes may be used. In such implementations, golden frame distances (e.g., distances between golden frames) may be reduced while the golden frames may still use a similar percentage of overall bits (e.g., as compared with the example of FIG. 3). In such implementations, a frame of golden frame class $G_0$ may be allocated a frame size and a QP may be determined as discussed herein with respect to, for example, Equation (2) with a lower weighting parameter W1. Furthermore, a frame of golden frame class $G_1$ may then be allocated a frame size and a QP as a fraction of the frame size of golden frame class $G_0$. A target size and QP for non-golden frames may then be provided in analogy to Equations (6) and (7) where bits may be evenly distributed to non-golden frames based on the target golden frame sizes and actual encoded golden frame sizes (e.g., for both classes).

Figures 5, 6:
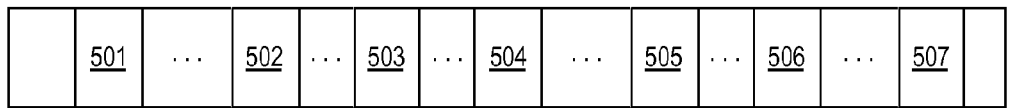
FIG. 5 illustrates an example bitstream.
FIG. 6 is a flow diagram illustrating an example process for providing video coding with golden frames.

FIG. 5 illustrates an example bitstream 500, arranged in accordance with at least some implementations of the present disclosure. In some examples, bitstream 500 may correspond to bitstream 128 as shown in FIG. 1. Although not shown in FIG. 5, in some examples, bitstream 500 may include a header portion or portions and a data portion or portions. Bitstream 500 may include any suitable data associated with encoded video data. As shown in FIG. 5, bitstream 500 may include encoded quantized transform coefficients 501, encoded modes data 502, encoded I-frame quantization parameters 503, encoded golden frame indicators 504, encoded golden P-frame quantization parameters 505, encoded non-golden P-frame quantization parameters 506, and/or encoded motion vector data 507. As discussed, bitstream 500 may be generated via entropy encoder 114 of system 100.

For example, bitstream 500 may include encoded quantized transform coefficients 501 that include transform coefficients quantized based on a quantization parameter for a first I-frame (as discussed with respect to Equation (1)), transform coefficients quantized based on a golden frame quantization parameter, and/or transform coefficients quantized based on a non-golden frame quantization parameter. The quantized transform coefficients may encoded (e.g., entropy encoded via entropy encoder 115) and inserted into bitstream 500. Furthermore, bitstream 500 may include encoded modes data 502 that may include mode(s) selection data from mode selection module 113 encoded (e.g., entropy encoded via entropy encoder 115) and inserted into bitstream 500. Also as shown, bitstream 500 may include encoded I-frame quantization parameters 503, encoded golden P-frame quantization parameters 505, and encoded non-golden P-frame quantization parameters 506, which may include frame level quantization parameters encoded (e.g., entropy encoded via entropy encoder 115) and inserted into bitstream 500.

Furthermore, bitstream 500 may include encoded golden frame indicators 504. Golden frame indicators 504 may include any suitable tag or bit or indicator or the like indicating which frames are golden frames. For example, golden frame indicators 504 may include data associated with golden frame indication(s) 121 and non-golden frame indication(s) 122 encoded (e.g., entropy encoded via entropy encoder 115) and inserted into bitstream 500. Bitstream 500 may also include encoded motion vector data 507 and other encoded data for providing information associated with the encoding of video 102. For example, motion vectors and/or other data may be encoded (e.g., entropy encoded via entropy encoder 115) and inserted into bitstream 500.

As discussed, bitstream 500 may be generated via an encoder or encoder system such as, for example, system 100, and bitstream 500 may be stored (e.g., as a file or container) to a memory (e.g., of system 100), stored (e.g., as a file or container) to a memory storage device (e.g., a disc, a server for download, or the like). Furthermore, bitstream 500 may be accessed (e.g., via reading a disc, streaming, downloading, or the like) by a decoder that may decode the bitstream and generate video frames or sequences of video frames for presentment to a user.

FIG. 6 is a flow diagram illustrating an example process 600 for providing video coding with golden frames, arranged in accordance with at least some implementations of the present disclosure. Process 600 may include one or more operations 601-603 as illustrated in FIG. 6. Process 600 may form at least part of a video encoding process. By way of non-limiting example, process 600 may form at least part of a video encoding process for video as undertaken by system 100 as discussed herein. Further, process 600 will be described herein in reference to system 700 of FIG. 7.

Figure 7:
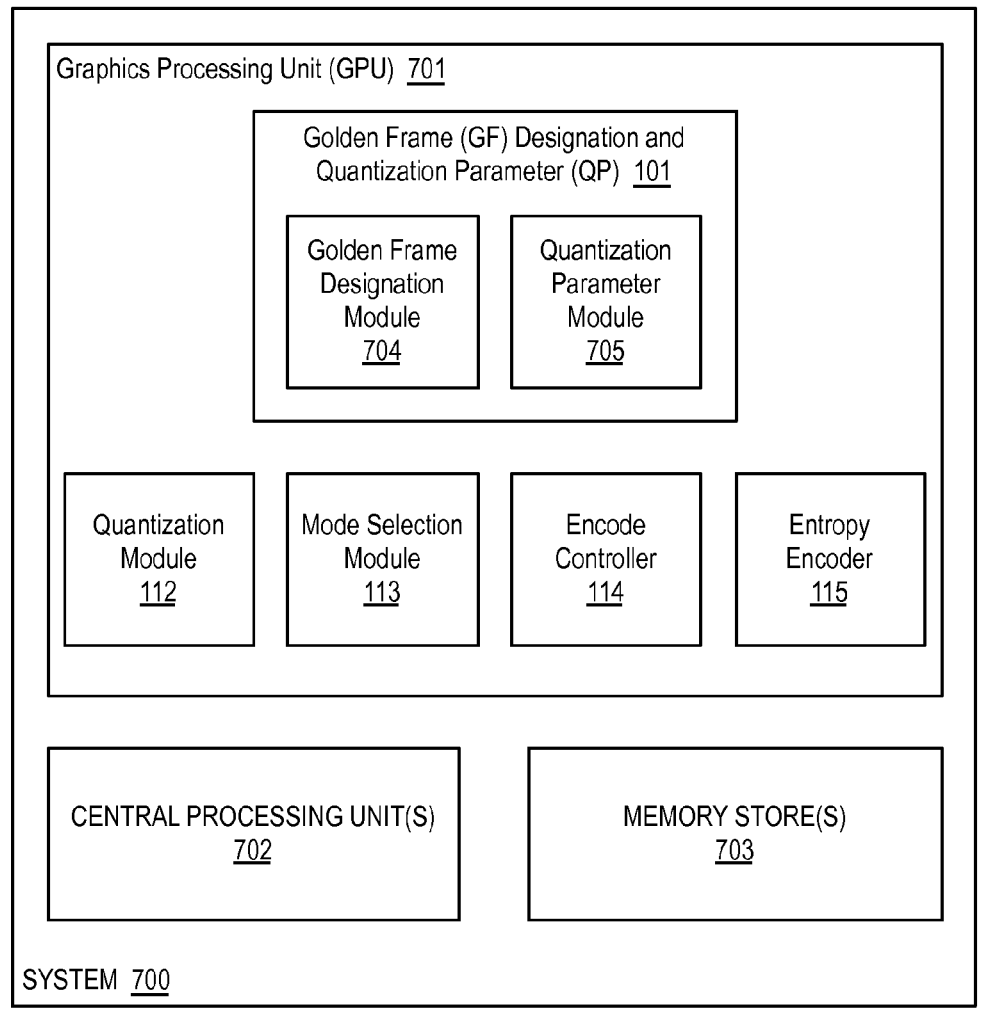
FIG. 7 is an illustrative diagram of an example system for providing video coding with golden frames.

FIG. 7 is an illustrative diagram of an example system 700 for providing video coding with golden frames, arranged in accordance with at least some implementations of the present disclosure. As shown in FIG. 7, system 700 may include a graphics processing unit (GPU) 701, one or more central processing units 702, and memory stores 703. Also as shown, GPU 701 may include golden frame designation and quantization parameter module 101, quantization module 112, mode selection module 113, encode controller 114, and/or entropy encoder module 115. Furthermore, golden frame designation and quantization parameter module 101 may, in some examples, include a golden frame designation module 704 and a quantization parameter module 705. For example, golden frame designation module 704 may implement golden frame designation module 108 and quantization parameter module 705 may implement golden frame size and QP module 110 and/or non-golden frame size and QP module 111. In other examples, golden frame designation and quantization parameter module 101 may be implemented without the illustrated sub-modules. In the example of system 700, memory stores 703 may store video content such as video frames and/or a bitstream.

Graphics processing unit 701 may include any number and type of graphics processing units that may provide the operations as discussed herein. Such operations may be implemented via software or hardware or a combination thereof. In an embodiment, the illustrated modules of graphics processing unit 701 may be implemented via circuitry or the like. For example, graphics processing unit 701 may include circuitry dedicated to manipulate video data to generate compressed video data. Central processing units 702 may include any number and type of processing units or modules that may provide control and other high level functions for system 700. Memory stores 703 may be any type of memory such as volatile memory (e.g., Static Random Access Memory (SRAM), Dynamic Random Access Memory (DRAM), etc.) or non-volatile memory (e.g., flash memory, etc.), and so forth. In an embodiment, memory stores 703 may be configured to store video data such as golden and/or non-golden frame sizes, golden and/or non-golden frame quantization parameters, quantized transform coefficients, a bitstream, or any other video data discussed herein. In a non-limiting example, memory stores 703 may be implemented by cache memory. In an embodiment, golden frame designation and quantization parameter module 101, quantization module 112, mode selection module 113, encode controller 114, and/or entropy encoder module 115 may be implemented via an execution unit (EU) of graphics processing unit 701. The EU may include, for example, programmable logic or circuitry such as a logic core or cores that may provide a wide array of programmable logic functions. In an embodiment, golden frame designation and quantization parameter module 101, quantization module 112, mode selection module 113, encode controller 114, and/or entropy encoder module 115 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 6, process 600 may begin at operation 601, "Determine, for a Frame of a Video Sequence, whether the Frame is a Scene Change Frame, a Golden Frame Distance, and an Average Temporal Distortion", where, for an individual frame of a video sequence, whether the individual frame is a scene change frame, a golden frame distance to a previous golden frame, and an average temporal distortion may be determined. For example, golden frame designation module 704 as implemented via GPU 701 may determine whether the individual frame is a scene change frame, a golden frame distance to a previous golden frame for the individual frame, and an average temporal distortion for the individual frame. In some examples, the average temporal distortion is an average of the temporal distortion of the individual frame and temporal distortions of frames of the sequence of frames preceding the individual frame. In some examples, one or more of golden frame designation module 108, as implemented via GPU 701 may determine whether the individual frame is a scene change frame, a golden frame distance to a previous golden frame for the individual frame, and an average temporal distortion for the individual frame.

Process 600 may continue at operation 602, "Designate the Frame as a Golden Frame or a Non-Golden Frame", where the individual frame may be designated as a golden frame or as a non-golden frame based on whether the individual frame is a scene change frame, the golden frame distance, and the average temporal distortion. For example, golden frame designation module 704 as implemented via GPU 701 may designate the individual frame as a golden frame or as a non-golden frame based on whether the individual frame is a scene change frame, the golden frame distance, and the average temporal distortion.

In some examples, if the individual frame may be designated as a golden frame when the individual frame is a scene change frame. Furthermore, in some examples, if the golden frame distance is at least one of equal to or greater than at least one of a minimum golden frame interval or a default golden frame interval, the individual frame may be designated as a golden frame or as a non-golden frame based on a comparison of the average temporal distortion to a threshold. For example, the individual frame may be designated as a golden frame when the average temporal distortion is greater than the threshold. In some examples, when the golden frame distance is not less than the golden frame interval, the individual frame may be designated as a golden frame when the average temporal distortion is greater than a first threshold associated with the minimum golden frame interval. Furthermore, when the average temporal distortion is not greater than the first threshold, and when the golden frame distance is not less than a default golden frame interval, the individual frame may be designated as a golden frame when the average temporal distortion is greater than a second threshold associated with the default golden frame interval. Also, when the golden frame distance is equal to a maximum golden frame interval, the individual frame may be designated as a golden frame.

Process 600 may continue at operation 603, "Determine a Quantization Parameter the Frame based on the Designation and a Temporal Distortion of the Frame", where a quantization parameter for at least a portion of the individual frame may be determined based on the designation of the individual frame as a golden frame or as a non-golden frame and a temporal distortion of the individual frame. For example, quantization parameter module 705 as implemented via GPU 701 may determine a quantization parameter for at least a portion of the individual frame based on the designation of the individual frame as a golden frame or as a non-golden frame and a temporal distortion of the individual frame. As discussed, the quantization parameter may be for a portion of the individual frame or for the entire individual frame. In some examples, the quantization parameter may be modified for portions of the individual frame based on local distortion patterns within the individual frame or the like.

For example, if the individual frame is designated as a golden frame, the quantization parameter may be determined by determining a golden frame target size for the individual frame based on the temporal distortion of the individual frame, the golden frame distance, and a target bitrate for the video sequence, as discussed with respect to Equation (2) herein, and modifying an initial quantization parameter by an offset based on the golden frame target size to generate the quantization parameter for the portion of the individual frame, as discussed with respect to Equation (6) herein. For example, the offset may be based on a ratio of the golden frame target size to a non-golden frame target size, as discussed with respect to Equations (4) and (5) herein, and modifying the initial quantization parameter by the offset may include subtracting the offset from the initial quantization parameter as discussed with respect to Equation (6) herein.

Furthermore, if the individual frame is designated as a non-golden frame and such that the individual frame is subsequent to a golden frame, the quantization parameter may be determined by encoding the golden frame, determining an encoded golden frame size for the individual frame (e.g., via encode controller 114 as implemented via GPU 701), determining a non-golden frame ratio for the individual frame based on the encoded golden frame size, the golden frame distance of the golden frame, the predetermined average target bitrate, and the golden frame target size, as discussed herein with respect to Equation (7), and modifying the initial quantization parameter (e.g., Initial_QP (P) or the like) by a non-golden frame offset (e.g., as discussed with respect to Equation (8)) based on the non-golden frame ratio to generate a quantization parameter for at least a portion of the individual frame. For example, modifying the initial quantization parameter may include adding the non-golden frame offset to the initial quantization parameter.

As discussed, golden frame and non-golden frame quantization parameters may be used to quantize transform coefficients associated with the golden and non-golden frames, respectively, and/or to make mode selection decisions associated with the video sequence. The golden frame and non-golden frame quantization parameters, quantized transform coefficients, and/or modes may be encoded into a bitstream as discussed herein. Process 600 may be repeated any number of times either in series or in parallel for any number of video frames, video sequences, or segments of video.

Various components of the systems described herein may be implemented in software, firmware, and/or hardware and/or any combination thereof. For example, various components of system 100 or system 700 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes (e.g., process 200 and process 600) discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
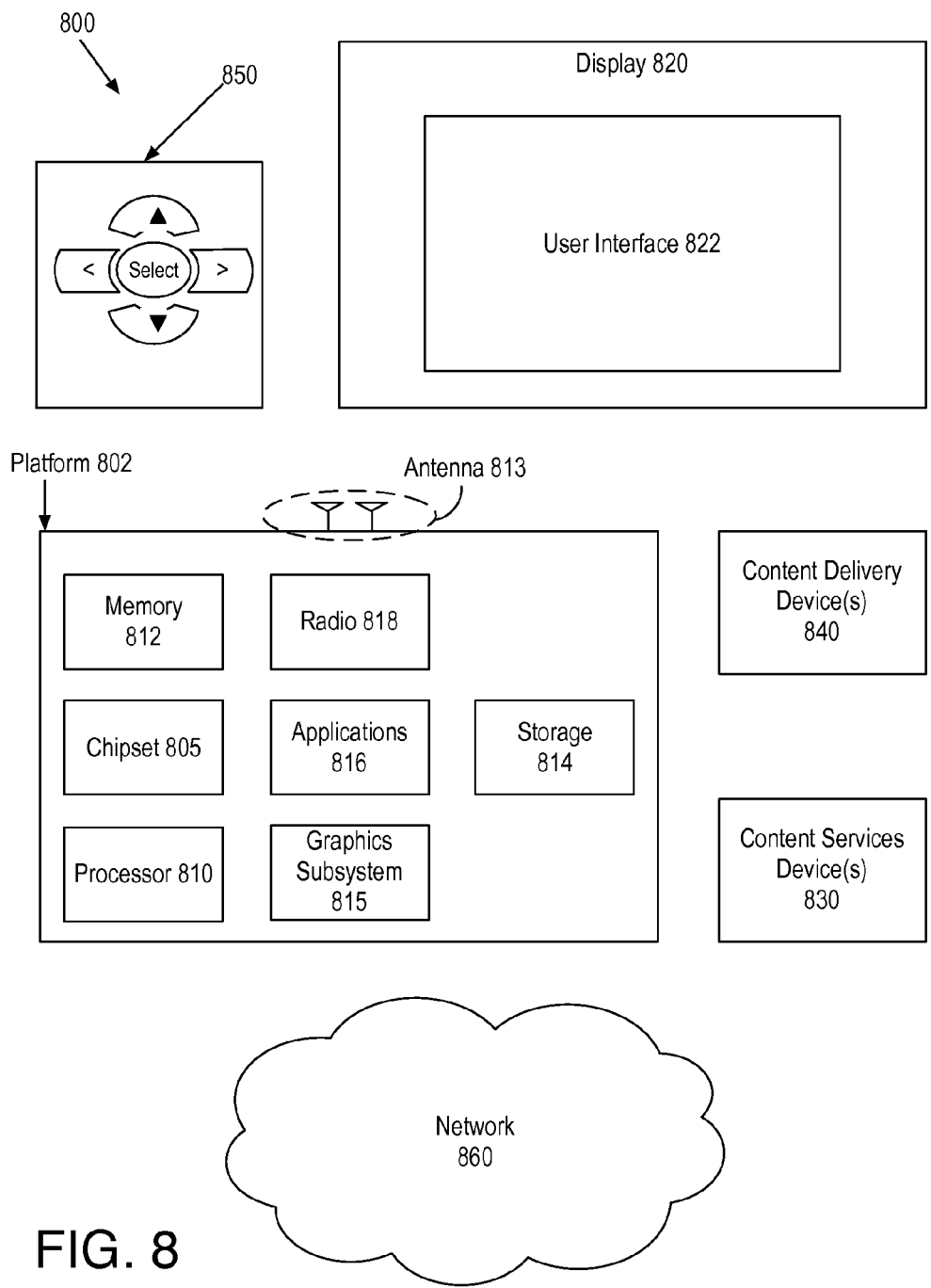
FIG. 8 is an illustrative diagram of an example system.

FIG. 8 is an illustrative diagram of an example system 800, arranged in accordance with at least some implementations of the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
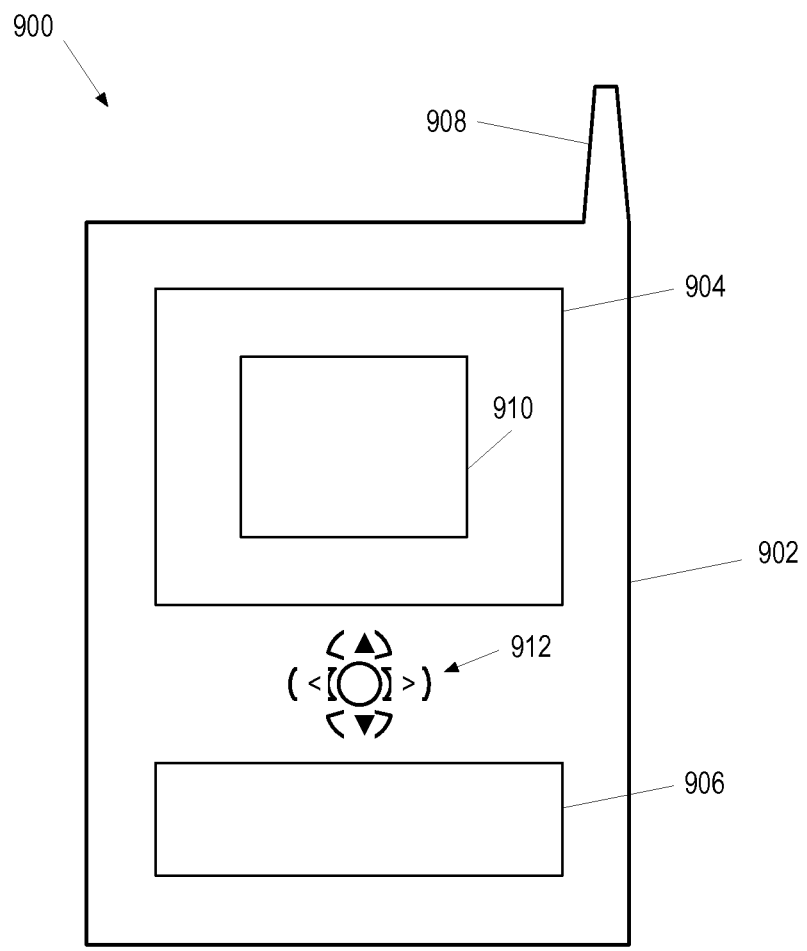
FIG. 9 illustrates an example device, all arranged in accordance with at least some implementations of the present disclosure.

As described above, system 800 may be embodied in varying physical styles or form factors. FIG. 9 illustrates implementations of a small form factor device 900 in which system 900 may be embodied. In various embodiments, for example, device 900 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. As shown, in some examples, display 904 may include a user interface 910. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video coding comprises determining, for an individual frame of a video sequence, whether the individual frame is a scene change frame, a golden frame distance to a previous golden frame, and an average temporal distortion, designating the individual frame as a golden frame or as a non-golden frame based on whether the individual frame is a scene change frame, the golden frame distance, and the average temporal distortion, and determining a quantization parameter for at least a portion of the individual frame based on the designation of the individual frame as a golden frame or as a non-golden frame and a temporal distortion of the individual frame.

Further to the first embodiments, the average temporal distortion comprises an average of the temporal distortion of the individual frame and temporal distortions of frames of the sequence of frames preceding the individual frame.

Further to the first embodiments, designating the individual frame as a golden frame or as a non-golden frame comprises designating the individual frame as a golden frame when the individual frame is a scene change frame.

Further to the first embodiments, the average temporal distortion comprises an average of the temporal distortion of the individual frame and temporal distortions of frames of the sequence of frames preceding the individual frame and/or wherein designating the individual frame as a golden frame or as a non-golden frame comprises designating the individual frame as a golden frame when the individual frame is a scene change frame.

Further to the first embodiments, designating the individual frame as a golden frame or as a non-golden frame comprises determining the golden frame distance is at least one of equal to or greater than at least one of a minimum golden frame interval or a default golden frame interval and designating the individual frame as a golden frame or as a non-golden frame based on a comparison of the average temporal distortion to a threshold associated with the minimum golden frame interval or the default golden frame interval.

Further to the first embodiments, designating the individual frame as a golden frame or as a non-golden frame comprises determining the golden frame distance is at least one of equal to or greater than at least one of a minimum golden frame interval or a default golden frame interval and designating the individual frame as a golden frame or as a non-golden frame based on a comparison of the average temporal distortion to a threshold associated with the minimum golden frame interval or the default golden frame interval, wherein the individual frame is designated as a golden frame when the average temporal distortion is greater than the threshold.

Further to the first embodiments, the method further comprises determining, for a second frame of the sequence of frames a second golden frame distance to the previous golden frame and a second average temporal distortion and designating the second frame as a golden frame or as a non-golden frame based on the second golden frame distance and the second average temporal distortion, wherein the golden frame distance is between a minimum golden frame interval and a default golden frame interval, wherein the second golden frame distance is between the default golden frame interval and a maximum golden frame interval, wherein designating the individual frame as a golden frame or as a non-golden frame comprises designating the individual frame as a golden frame or as a non-golden frame based on a comparison of the average temporal distortion to a first threshold, wherein designating the second frame as a golden frame or as a non-golden frame comprises designating the second frame as a golden frame or as a non-golden frame based on a comparison of the second average temporal distortion to a second threshold, and wherein the first threshold is greater than the second threshold.

Further to the first embodiments, designating the individual frame as a golden frame or as a non-golden frame comprises determining the golden frame distance is not less than a minimum golden frame interval, designating the individual frame as a golden frame when the average temporal distortion is greater than a first threshold associated with the minimum golden frame interval, determining, when the average temporal distortion is not greater than the first threshold, the golden frame distance is not less than a default golden frame interval, and designating the individual frame as a golden frame when the average temporal distortion is greater than a second threshold associated with the default golden frame interval.

Further to the first embodiments, determining the quantization parameter for the portion of the individual frame comprises determining, when the individual frame is designated as a golden frame, a golden frame target size for the individual frame based on the temporal distortion of the individual frame, the golden frame distance, and a target bitrate for the video sequence and modifying an initial quantization parameter by an offset based on the golden frame target size to generate the quantization parameter for the portion of the individual frame.

Further to the first embodiments, determining the quantization parameter for the portion of the individual frame comprises determining, when the individual frame is designated as a golden frame, a golden frame target size for the individual frame based on the temporal distortion of the individual frame, the golden frame distance, and a target bitrate for the video sequence and modifying an initial quantization parameter by an offset based on the golden frame target size to generate the quantization parameter for the portion of the individual frame, and the method further comprises encoding the individual frame, determining an encoded golden frame size for the individual frame, determining a non-golden frame ratio for a second frame subsequent to the individual frame based on the encoded golden frame size, the golden frame distance, the predetermined average target bitrate, and the golden frame target size, and modifying the initial quantization parameter by a non-golden frame offset based on the non-golden frame ratio to generate a second quantization parameter for at least a portion of the second frame.

Further to the first embodiments, determining the quantization parameter for the portion of the individual frame comprises determining, when the individual frame is designated as a golden frame, a golden frame target size for the individual frame based on the temporal distortion of the individual frame, the golden frame distance, and a target bitrate for the video sequence and modifying an initial quantization parameter by an offset based on the golden frame target size to generate the quantization parameter for the portion of the individual frame, wherein the offset is based on a ratio of the golden frame target size to a non-golden frame target size, and wherein modifying the initial quantization parameter by the offset comprises subtracting the offset from the initial quantization parameter.

Further to the first embodiments, the method further comprises determining a second quantization parameter for at least a portion of a non-golden frame subsequent to the golden frame, wherein the first quantization parameter is less than the second quantization parameter.

Further to the first embodiments, the individual frame is designated as a golden frame and the method further comprises designating a second frame of the plurality of the video sequence as a second golden frame and determining a second quantization parameter for at least a portion of the second frame, wherein the individual frame is of a first golden frame class and the second frame is of a second golden frame class, and wherein the quantization parameter is less than the second quantization parameter.

Further to the first embodiments, the method further comprises quantizing transform coefficients associated with the individual frame based on the quantization parameter, generating a mode selection associated with the video sequence based at least in part on the quantization parameter, and encoding the quantized transform coefficients and the quantization parameter into a bitstream.

In one or more second embodiments, a system for providing video coding on a computing device comprises a memory configured to store video data and a graphics processing unit coupled to the memory, wherein the graphics processing unit comprises golden frame selection circuitry configured to determine, for an individual frame of a video sequence, whether the individual frame is a scene change frame, a golden frame distance to a previous golden frame, and an average temporal distortion and designate the individual frame as a golden frame or as a non-golden frame based on whether the individual frame is a scene change frame, the golden frame distance, and the average temporal distortion and quantization parameter circuitry configured to determine a quantization parameter for at least a portion of the individual frame based on the designation of the individual frame as a golden frame or as a non-golden frame and a temporal distortion of the individual frame.

Further to the second embodiments, the golden frame selection circuitry is configured to designate the individual frame as a golden frame when the individual frame is a scene change frame.

Further to the second embodiments, the golden frame selection circuitry being configured to designate the individual frame as a golden frame or as a non-golden frame comprises the golden frame selection circuitry being configured to determine the golden frame distance is at least one of equal to or greater than at least one of a minimum golden frame interval or a default golden frame interval and designate the individual frame as a golden frame or as a non-golden frame based on a comparison of the average temporal distortion to a threshold associated with the minimum golden frame interval or the default golden frame interval.

Further to the second embodiments, the golden frame selection circuitry being configured to designate the individual frame as a golden frame or as a non-golden frame comprises the golden frame selection circuitry being configured to determine the golden frame distance is at least one of equal to or greater than at least one of a minimum golden frame interval or a default golden frame interval and designate the individual frame as a golden frame or as a non-golden frame based on a comparison of the average temporal distortion to a threshold associated with the minimum golden frame interval or the default golden frame interval, wherein the individual frame is designated as a golden frame when the average temporal distortion is greater than the threshold.

Further to the second embodiments, the golden frame selection circuitry is further configured to determine, for a second frame of the sequence of frames a second golden frame distance to the previous golden frame and a second average temporal distortion and designate the second frame as a golden frame or as a non-golden frame based on the second golden frame distance and the second average temporal distortion, wherein the golden frame distance is between a minimum golden frame interval and a default golden frame interval, wherein the second golden frame distance is between the default golden frame interval and a maximum golden frame interval, wherein the golden frame selection circuitry is configured to designate the individual frame as a golden frame or as a non-golden frame based on a comparison of the average temporal distortion to a first threshold, wherein the golden frame selection circuitry is configured to designate the second frame as a golden frame or as a non-golden frame based on a comparison of the second average temporal distortion to a second threshold, and wherein the first threshold is greater than the second threshold.

Further to the second embodiments, the quantization parameter circuitry being configured to determine the quantization parameter comprises the quantization parameter circuitry being configured to determine, when the individual frame is designated as a golden frame, a golden frame target size for the individual frame based on the temporal distortion of the individual frame, the golden frame distance, and a target bitrate for the video sequence and modify an initial quantization parameter by an offset based on the golden frame target size to generate the quantization parameter for the portion of the individual frame.

Further to the second embodiments, the quantization parameter circuitry being configured to determine the quantization parameter comprises the quantization parameter circuitry being configured to determine, when the individual frame is designated as a golden frame, a golden frame target size for the individual frame based on the temporal distortion of the individual frame, the golden frame distance, and a target bitrate for the video sequence and modify an initial quantization parameter by an offset based on the golden frame target size to generate the quantization parameter for the portion of the individual frame, and the system further comprises an entropy encoder configured to encode the individual frame and an encode controller configured to determine an encoded golden frame size for the individual frame, wherein the quantization parameter circuitry is further configured to determine a non-golden frame ratio for a second frame subsequent to the individual frame based on the encoded golden frame size, the golden frame distance, the predetermined average target bitrate, and the golden frame target size and modify the initial quantization parameter by a non-golden frame offset based on the non-golden frame ratio to generate a second quantization parameter for at least a portion of the second frame.

Further to the second embodiments, the quantization parameter circuitry being configured to determine the quantization parameter comprises the quantization parameter circuitry being configured to determine, when the individual frame is designated as a golden frame, a golden frame target size for the individual frame based on the temporal distortion of the individual frame, the golden frame distance, and a target bitrate for the video sequence and modify an initial quantization parameter by an offset based on the golden frame target size to generate the quantization parameter for the portion of the individual frame, wherein the offset is based on a ratio of the golden frame target size to a non-golden frame target size, and wherein the quantization parameter circuitry being configured to modify the initial quantization parameter by the offset comprises the quantization parameter circuitry being configured to subtract the offset from the initial quantization parameter.

Further to the second embodiments, the quantization parameter circuitry is further configured to determine a second quantization parameter for at least a portion of a non-golden frame subsequent to the golden frame, wherein the first quantization parameter is less than the second quantization parameter.

Further to the second embodiments, the golden frame selection circuitry is further configured to designate a second frame of the plurality of the video sequence as a second golden frame and determine a second quantization parameter for at least a portion of the second frame, wherein the individual frame is of a first golden frame class and the second frame is of a second golden frame class, and wherein the quantization parameter is less than the second quantization parameter.

In one or more third embodiments, a system for providing video coding on a computing device comprises means for determining, for an individual frame of a video sequence, whether the individual frame is a scene change frame, a golden frame distance to a previous golden frame, and an average temporal distortion, means for designating the individual frame as a golden frame or as a non-golden frame based on whether the individual frame is a scene change frame, the golden frame distance, and the average temporal distortion, and means for determining a quantization parameter for at least a portion of the individual frame based on the designation of the individual frame as a golden frame or as a non-golden frame and a temporal distortion of the individual frame.

Further to the third embodiments, designating the individual frame as a golden frame or as a non-golden frame comprises designating the individual frame as a golden frame when the individual frame is a scene change frame.

Further to the third embodiments, the means for designating the individual frame as a golden frame or as a non-golden frame comprise means for determining the golden frame distance is at least one of equal to or greater than at least one of a minimum golden frame interval or a default golden frame interval and means for designating the individual frame as a golden frame or as a non-golden frame based on a comparison of the average temporal distortion to a threshold associated with the minimum golden frame interval or the default golden frame interval.

Further to the third embodiments, the system further comprises means for determining, for a second frame of the sequence of frames a second golden frame distance to the previous golden frame and a second average temporal distortion and means for designating the second frame as a golden frame or as a non-golden frame based on the second golden frame distance and the second average temporal distortion, wherein the golden frame distance is between a minimum golden frame interval and a default golden frame interval, wherein the second golden frame distance is between the default golden frame interval and a maximum golden frame interval, wherein designating the individual frame as a golden frame or as a non-golden frame comprises designating the individual frame as a golden frame or as a non-golden frame based on a comparison of the average temporal distortion to a first threshold, wherein designating the second frame as a golden frame or as a non-golden frame comprises designating the second frame as a golden frame or as a non-golden frame based on a comparison of the second average temporal distortion to a second threshold, and wherein the first threshold is greater than the second threshold.

In one or more fourth embodiments, at least one machine readable medium comprises a plurality of instructions that in response to being executed on a computing device, cause the computing device to perform video coding by determining, for an individual frame of a video sequence, whether the individual frame is a scene change frame, a golden frame distance to a previous golden frame, and an average temporal distortion, designating the individual frame as a golden frame or as a non-golden frame based on whether the individual frame is a scene change frame, the golden frame distance, and the average temporal distortion, and determining a quantization parameter for at least a portion of the individual frame based on the designation of the individual frame as a golden frame or as a non-golden frame and a temporal distortion of the individual frame.

Further to the fourth embodiments, designating the individual frame as a golden frame or as a non-golden frame comprises designating the individual frame as a golden frame when the individual frame is a scene change frame.

Further to the fourth embodiments, designating the individual frame as a golden frame or as a non-golden frame comprises determining the golden frame distance is at least one of equal to or greater than at least one of a minimum golden frame interval or a default golden frame interval and designating the individual frame as a golden frame or as a non-golden frame based on a comparison of the average temporal distortion to a threshold associated with the minimum golden frame interval or the default golden frame interval.

Further to the fourth embodiments, the machine readable medium comprises further instructions that in response to being executed on the computing device, cause the computing device to perform video coding by determining, for a second frame of the sequence of frames a second golden frame distance to the previous golden frame and a second average temporal distortion and designating the second frame as a golden frame or as a non-golden frame based on the second golden frame distance and the second average temporal distortion, wherein the golden frame distance is between a minimum golden frame interval and a default golden frame interval, wherein the second golden frame distance is between the default golden frame interval and a maximum golden frame interval, wherein designating the individual frame as a golden frame or as a non-golden frame comprises designating the individual frame as a golden frame or as a non-golden frame based on a comparison of the average temporal distortion to a first threshold, wherein designating the second frame as a golden frame or as a non-golden frame comprises designating the second frame as a golden frame or as a non-golden frame based on a comparison of the second average temporal distortion to a second threshold, and wherein the first threshold is greater than the second threshold.

Further to the fourth embodiments, determining the quantization parameter for the portion of the individual frame comprises determining, when the individual frame is designated as a golden frame, a golden frame target size for the individual frame based on the temporal distortion of the individual frame, the golden frame distance, and a target bitrate for the video sequence and modifying an initial quantization parameter by an offset based on the golden frame target size to generate the quantization parameter for the portion of the individual frame.

Further to the fourth embodiments, the machine readable medium comprises further instructions that in response to being executed on the computing device, cause the computing device to perform video coding by encoding the individual frame, determining an encoded golden frame size for the individual frame, determining a non-golden frame ratio for a second frame subsequent to the individual frame based on the encoded golden frame size, the golden frame distance, the predetermined average target bitrate, and the golden frame target size, and modifying the initial quantization parameter by a non-golden frame offset based on the non-golden frame ratio to generate a second quantization parameter for at least a portion of the second frame.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
   determining, for a first frame of a video sequence, whether the first frame is a scene change frame, a first golden frame distance to a previous golden frame, and a first average temporal distortion and determining, for a second frame of the video sequence, a second golden frame distance to the previous golden frame and a second average temporal distortion;
   designating the first frame as a golden frame or as a non-golden frame based on whether the first frame is a scene change frame, the first golden frame distance, and the first average temporal distortion and designating the second frame as a golden frame or as a non-golden frame based on the second golden frame distance and the second average temporal distortion, wherein the first golden frame distance is between a minimum golden frame interval and a default golden frame interval, the second golden frame distance is between the default golden frame interval and a maximum golden frame interval, designating the first frame as a golden frame or as a non-golden frame is based on a comparison of the first average temporal distortion to a first threshold, and designating the second frame as a golden frame or as a non-golden frame is based on a comparison of the second average temporal distortion to a second threshold less than the first threshold; and
   determining a quantization parameter for at least a portion of the first frame based on the designation of the first frame as a golden frame or as a non-golden frame and a temporal distortion of the first frame.

2. The method of claim 1, wherein the first average temporal distortion comprises an average of the temporal distortion of the first frame and temporal distortions of frames of the sequence of frames preceding the first frame.

3. The method of claim 1, wherein designating the first frame as a golden frame or as a non-golden frame comprises designating the first frame as a golden frame when the first frame is a scene change frame.

4. The method of claim 1, wherein the first frame is designated as a golden frame when the first average temporal distortion is greater than the first threshold.

5. The method of claim 1, wherein the second frame is designated as a golden frame when the second average temporal distortion is greater than the second threshold.

6. The method of claim 1, wherein determining the quantization parameter for the portion of the first frame comprises:
   determining, when the first frame is designated as a golden frame, a golden frame target size for the first frame based on the temporal distortion of the first frame, the first golden frame distance, and a target bitrate for the video sequence; and
   modifying an initial quantization parameter by an offset based on the golden frame target size to generate the quantization parameter for the portion of the first frame.

7. The method of claim 6, further comprising:
   encoding the first frame;
   determining an encoded golden frame size for the first frame;

determining a non-golden frame ratio for a third frame subsequent to the first frame based on the encoded golden frame size, the first golden frame distance, the target bitrate, and the golden frame target size; and modifying the initial quantization parameter by a non-golden frame offset based on the non-golden frame ratio to generate a second quantization parameter for at least a portion of the third frame.

8. The method of claim 6, wherein the offset is based on a ratio of the golden frame target size to a non-golden frame target size, and wherein modifying the initial quantization parameter by the offset comprises subtracting the offset from the initial quantization parameter.

9. The method of claim 1, wherein the first frame is designated as a golden frame, the method further comprising:

determining a second quantization parameter for at least a portion of a non-golden frame subsequent to the first frame, wherein the quantization parameter is less than the second quantization parameter.

10. The method of claim 1, wherein the first frame is designated as a golden frame, the method further comprising:

designating a third frame of the plurality of the video sequence as a second golden frame; and determining a second quantization parameter for at least a portion of the third frame, wherein the first frame is of a first golden frame class and the third frame is of a second golden frame class, and wherein the quantization parameter is less than the second quantization parameter.

11. The method of claim 1, further comprising:

quantizing transform coefficients associated with the first frame based on the quantization parameter;

generating a mode selection associated with the video sequence based at least in part on the quantization parameter; and encoding the quantized transform coefficients and the quantization parameter into a bitstream.

12. A system for providing video coding on a computing device, comprising:

a memory configured to store video data; and a processor coupled to the memory, the processor to:

determine, for a first frame of a video sequence, whether the first frame is a scene change frame, a first golden frame distance to a previous golden frame, and a first average temporal distortion and determine, for a second frame of the video sequence, a second golden frame distance to the previous golden frame and a second average temporal distortion;

designate the first frame as a golden frame or as a non-golden frame based on whether the first frame is a scene change frame, the first golden frame distance, and the first average temporal distortion and designate the second frame as a golden frame or as a non-golden frame based on the second golden frame distance and the second average temporal distortion, wherein the first golden frame distance is between a minimum golden frame interval and a default golden frame interval, the second golden frame distance is between the default golden frame interval and a maximum golden frame interval, designating the first frame as a golden frame or as a non-golden frame is based on a comparison of the first average temporal distortion to a first threshold, and designating the second frame as a golden frame or as a non-golden frame is based on a comparison of the second average temporal distortion to a second threshold less than the first threshold; and determine a quantization parameter for at least a portion of the first frame based on the designation of the first frame as a golden frame or as a non-golden frame and a temporal distortion of the first frame.

13. The system of claim 12, wherein the processor is to designate the first frame as a golden frame when the first frame is a scene change frame.

14. The system of claim 12, wherein the first frame is designated as a golden frame when the first average temporal distortion is greater than the first threshold.

15. The system of claim 12, wherein the second frame is designated as a golden frame when the second average temporal distortion is greater than the first threshold.

16. The system of claim 12, wherein the processor to determine the quantization parameter for the portion of the first frame comprises the processor to:

determine, when the first frame is designated as a golden frame, a golden frame target size for the first frame based on the temporal distortion of the first frame, the first golden frame distance, and a target bitrate for the video sequence; and modify an initial quantization parameter by an offset based on the golden frame target size to generate the quantization parameter for the portion of the first frame.

17. The system of claim 12, wherein the first frame is designated as a golden frame and the processor is to:

designate a third frame of the plurality of the video sequence as a second golden frame; and determine a second quantization parameter for at least a portion of the third frame, wherein the first frame is of a first golden frame class and the third frame is of a second golden frame class, and wherein the quantization parameter is less than the second quantization parameter.

18. At least one non-transitory machine readable medium comprising a plurality of instructions that, in response to being executed on a computing device, cause the computing device to perform video coding by:

determining, for a first frame of a video sequence, whether the first frame is a scene change frame, a first golden frame distance to a previous golden frame, and a first average temporal distortion and determining, for a second frame of the video sequence, a second golden frame distance to the previous golden frame and a second average temporal distortion;

designating the first frame as a golden frame or as a non-golden frame based on whether the first frame is a scene change frame, the first golden frame distance, and the first average temporal distortion and designating the second frame as a golden frame or as a non-golden frame based on the second golden frame distance and the second average temporal distortion, wherein the first golden frame distance is between a minimum golden frame interval and a default golden frame interval, the second golden frame distance is between the default golden frame interval and a maximum golden frame interval, designating the first frame as a golden frame or as a non-golden frame is based on a comparison of the first average temporal distortion to a first threshold, and designating the second frame as a golden frame or as a non-golden frame is based on a comparison of the second average temporal distortion to a second threshold less than the first threshold; and determining a quantization parameter for at least a portion of the first frame based on the designation of the first frame as a golden frame or as a non-golden frame and a temporal distortion of the first frame.

19. The machine readable medium of claim 18, wherein designating the first frame as a golden frame or as a non-golden frame comprises designating the first frame as a golden frame when the first frame is a scene change frame.

20. The machine readable medium of claim 18, wherein the first frame is designated as a golden frame when the first average temporal distortion is greater than the first threshold.

21. The machine readable medium of claim 18, wherein the second frame is designated as a golden frame when the second average temporal distortion is greater than the second threshold.

22. The machine readable medium of claim 18, wherein determining the quantization parameter for the portion of the first frame comprises:
   determining, when the first frame is designated as a golden frame, a golden frame target size for the first frame based on the temporal distortion of the first frame, the first golden frame distance, and a target bitrate for the video sequence; and
   modifying an initial quantization parameter by an offset based on the golden frame target size to generate the quantization parameter for the portion of the first frame.

23. The machine readable medium of claim 22 comprising further instructions that in response to being executed on the computing device, cause the computing device to perform video coding by:
   encoding the first frame;
   determining an encoded golden frame size for the first frame;
   determining a non-golden frame ratio for a third frame subsequent to the first frame based on the encoded golden frame size, the first golden frame distance, the target bitrate, and the golden frame target size; and
   modifying the initial quantization parameter by a non-golden frame offset based on the non-golden frame ratio to generate a second quantization parameter for at least a portion of the third frame.

24. The system of claim 12, wherein the first frame is designated as a golden frame and the processor is to:
   determine a second quantization parameter for at least a portion of a non-golden frame subsequent to the first frame, wherein the quantization parameter is less than the second quantization parameter.

25. The system of claim 12, wherein the processor is to:
   quantize transform coefficients associated with the first frame based on the quantization parameter;
   generate a mode selection associated with the video sequence based at least in part on the quantization parameter; and
   encode the quantized transform coefficients and the quantization parameter into a bitstream.

* * * * *